United States Patent
Lee et al.

(10) Patent No.: US 8,259,695 B2
(45) Date of Patent: Sep. 4, 2012

(54) METHOD AND APPARATUS FOR PACKET WIRELESS TELECOMMUNICATIONS

(75) Inventors: Jung Ah Lee, Pittstown, NJ (US); Said Tatesh, Swindon (GB); Hai Zhou, Faringdon (GB)

(73) Assignee: Alcatel Lucent, Paris (FR)

( * ) Notice: Subject to any disclaimer, the term of this patent is extended or adjusted under 35 U.S.C. 154(b) by 1122 days.

(21) Appl. No.: 11/796,853

(22) Filed: Apr. 30, 2007

(65) Prior Publication Data

US 2008/0267157 A1 Oct. 30, 2008

(51) Int. Cl.
H04B 7/216 (2006.01)

(52) U.S. Cl. ........................................ 370/342
(58) Field of Classification Search ............... None
See application file for complete search history.

(56) References Cited

U.S. PATENT DOCUMENTS

| | | | |
|---|---|---|---|
| 2003/0086371 A1* | 5/2003 | Walton et al. | 370/235 |
| 2006/0050664 A1* | 3/2006 | Guey | 370/329 |
| 2007/0201569 A1* | 8/2007 | Pajukoski et al. | 375/260 |
| 2007/0211815 A1* | 9/2007 | Pan et al. | 375/267 |
| 2008/0253487 A1* | 10/2008 | Abrishamkar et al. | 375/346 |
| 2009/0028065 A1* | 1/2009 | Iwai et al. | 370/252 |

* cited by examiner

*Primary Examiner* — Patrick Edouard
*Assistant Examiner* — Shantel L Heiber

(57) ABSTRACT

In a wireless telecommunications network, a Code Division Multiple Access (CDMA) scheme is applied to data to encode it. The encoded data transmitted in the uplink using an Orthogonal Frequency Division Multiplexing (OFDM) frame structure including a cyclic prefix (CP). The CDMA encoded data may be time multiplexed with Single Carrier-Frequency Division Multiple Access (SC-FDMA) transmissions. The CDMA transmissions may be used for relatively small payloads, such as those associated with voice traffic and control signals, and the SC-FDMA transmissions used for higher date rate transmissions. This enables autonomous transmission, without scheduling, for smaller payloads. A transmitter includes a selector 3 for performing time multiplexing in the uplink, the required mode being indicated by the Hybrid Automatic Repeat Request (HARQ) ID. A first branch 1 carries SC-FDMA data and a second branch 2 carries data to be transmitted as a CDMA scheme. A CAZAC code may be used in encoding the CDMA data.

23 Claims, 5 Drawing Sheets

METHOD AND APPARATUS FOR PACKET WIRELESS TELECOMMUNICATIONS

FIELD OF THE INVENTION

The present invention relates to a method and apparatus for packet wireless telecommunications, and more particularly, but not exclusively, to those that are compliant with UMTS Long Term Evolution (LTE) standards.

BACKGROUND OF THE INVENTION

Universal Mobile Telecommunications System (UMTS) is a current standard for wireless radio telecommunication networks. Efforts are being directed to develop an evolved standard, UMTS Long Term Evolution (LTE), also known as E-UTRA (Evolved UMTS Terrestrial Radio Access).

In E-UTRA, in the downlink, orthogonal frequency division multiplexing (OFDM) is proposed. In OFDM, the sub-carriers are orthogonal to one another and each is modulated with a data stream. The downlink data modulation may be performed using QPSK, 16QAM or 64QAM.

In the uplink, single carrier frequency division multiple access (SC-FDMA) has been introduced, in which discrete Fourier transform (DFT) precoding is applied to spread OFDM signals across a single carrier. Orthogonality of in-cell users is achieved by the OFDM in the presence of frequency-selective fading. The DFT precoding allows an improved peak-to-average power ratio (PAPR) compared to what would be available if pure OFDM were to be implemented in the uplink. SC-FDMA may be used with frequency division duplex (FDD) or time division duplex (TDD) modulation in the uplink. Each sub-carrier used for transmission includes information for all the transmitted modulated signals, the input data stream being spread over them. Data transmission in the uplink is fully scheduled, involving transmission of scheduling request and scheduling information on the uplink. With the addition of higher-order modulation and AMC, large spectral efficiency is possible by scheduling users with favorable channel conditions.

To realize the large spectral efficiency of the SC-FDMA scheme, fast scheduling in time and frequency is necessary. This may add large amount of scheduling overhead both in the uplink and the downlink control channels, and may be inefficient to support large number of delay-sensitive, low data rate traffic flows. One possible approach for supporting low data rate traffic flows is to semi-statically allocate time-frequency zones, or interference avoidance schemes. This may result in low channel utilization.

Current 3GPP specifications relating to LTE are TS 36.211: Physical channels and modulation, which describes the multiple access scheme and TS 36.300: E-UTRAN overall description, Stage 2, which provides a description of MAC, including scheduling, and both these documents are incorporated herein by reference.

BRIEF SUMMARY OF THE INVENTION

In one aspect of the invention, a method for transmitting data via a packet wireless telecommunications network includes the steps of: applying a Code Division Multiple Access (CDMA) scheme to data to encode it. The encoded data is transmitted in an Orthogonal Frequency Division Multiplexing (OFDM) frame structure which includes a cyclic prefix (CP). This allows autonomous transmission, and is particularly advantageous where the data payloads are small, for example for voice over IP (VoIP) traffic and control signals. It avoids the need to explicitly schedule time, frequency and code resources at each transmission instance. Thus, information bits may be transmitted without scheduling overhead. Reduced latency in transmission and reception is possible. Any OFDM frame structure with CP is applicable to the invention, including generic frame structure and TDD alternative frame structure. In one embodiment, the invention may be implemented with a simple receiver structure to provide potentially large capacity. Thus, a large number of users for the same radio resource may be supported, giving base station cost savings.

The data may be encoded by using a CDMA scheme by block repetition followed by scrambling by a Constant-Amplitude Zero Auto-Correlation (CAZAC) sequence. Users with similar radio propagation conditions may be placed in a group and assigned different orthogonal CAZAC sequences. Different groups are assigned different basic CAZAC sequences. This facilitates receiver design using a successive interference cancellation (SIC) receiver. In another aspect, users are assigned different pseudo-random sequences with low correlation properties.

The OFDM frame structure may be used in Single Carrier-Frequency Division Multiple Access (SC-FDMA).

The CDMA transmission in the FDMA frame structure may be in the uplink between a user terminal and a base station. In one advantageous embodiment, it is in a network implemented in accordance with LTE.

In one aspect of the invention, the method includes the step of time multiplexing CDMA and SC-FDMA transmissions. The CDMA encoded data may be voice data and the SC-FDMA transmissions may be data packets having a larger payload than the CDMA encoded packets. The Hybrid Automatic Repeat Request (HARQ) process ID may be used to identify in which mode of transmission data is to be sent.

In another aspect of the invention, a method for transmitting data via a packet wireless radio communications network includes the steps of: in the uplink between a user terminal and the base station, using scheduled transmission for data packets with larger payloads and autonomous transmission for data packets with smaller payloads. Data packets with smaller payloads may carry voice data or control signals, for example, and the data packets with larger payloads may carry non-voice data, such as high data rate, non-delay sensitive traffic.

In one method in accordance with the invention, in the downlink, transmission may use OFDM, and, in the uplink, time multiplexed SC-FDMA transmissions for larger payload data packets and CDMA transmissions for smaller payload data packets.

In another aspect of the invention, a wireless telecommunications network implements one or more of the foregoing. One network, for example, comprises a base station and a plurality of user terminals, the uplink between a user terminal and the base station being single carrier frequency division multiple access (SC-FDMA) for larger packets and using autonomous transmission for smaller packets.

Various frequency reuse schemes are considered in LTE [TR25.814, R1-061375]. The current working assumption on frequency reuse is (a) semi-static frequency allocation on the order of days and (b) dynamic frequency allocation on the order of seconds. Dynamic frequency allocation can be made to adapt to cell loading or user loading variations. In this case, the reuse pattern can change between (1,1) reuse and (1,3). In (1,3) reuse, only ⅓ of the sub-carriers is available to a user. With the flexibility of SC-FDMA structure, soft frequency reuse for cell-edge users is envisioned to mitigate the impact of co-channel interference. The proposed CDMA transmission can softly adapt to bandwidth changes by changing the SF. If the full bandwidth is available, VoIP transmission with SF=12 can be supported. When ⅓ of the spectrum is available, spreading factor can be reduced to SF=4 to preserve the rates of each user. In this case, fewer numbers of users can be multiplexed in a given CDMA time-frequency resource. For some applications, capacity in terms of number of users may be more important than preserving per-user data rates. In such a scenario, per-user data rate may be reduced while preserving the user capacity, by reducing the modulation order, or by limiting the number of HARQ processes per user.

In another aspect of the invention, a wireless telecommunications network for transmitting data packets, comprises a base station; a plurality of user terminals; and includes a transmitter having an encoder for encoding data using a CDMA scheme and arranged to transmit the encoded data in an OFDM frame structure which includes a CP. In one embodiment, the encoder performs block repetition followed by scrambling by CAZAC sequence to encode the data as a CDMA scheme. A a multiplexer may be included to time multiplex CDMA transmissions with SC-FDMA transmissions in the uplink.

In another aspect of the invention, a transmitter for a wireless telecommunication arrangement, comprises an encoder for encoding data using a CDMA scheme and is arranged to transmit the encoded data in an OFDM frame structure which includes a CP. The encoder may perform block repetition followed by scrambling by CAZAC sequence to encode the data as a CDMA scheme. The transmitter may include a multiplexer for time multiplexing CDMA transmissions with SC-FDMA transmissions in the uplink.

In another aspect of the invention, a receiver for a wireless telecommunication arrangement comprises a receiver processor for decoding received data that has been encoded using a CDMA scheme transmitted in an OFDM frame structure which includes a CP. The receiver may comprise a successive interference cancellation (SIC) receiver processor. This is a relatively simple structure compared to a rake receiver arrangement, for example. The receiver may comprise a decoder for decoding SC-FDMA transmissions time multiplexed with CDMA transmissions.

BRIEF DESCRIPTION OF THE DRAWINGS

Some embodiments of the present invention will now be described by way of example only, and with reference to the accompanying drawings, in which.

DETAILED DESCRIPTION OF THE INVENTION

Figure 1:
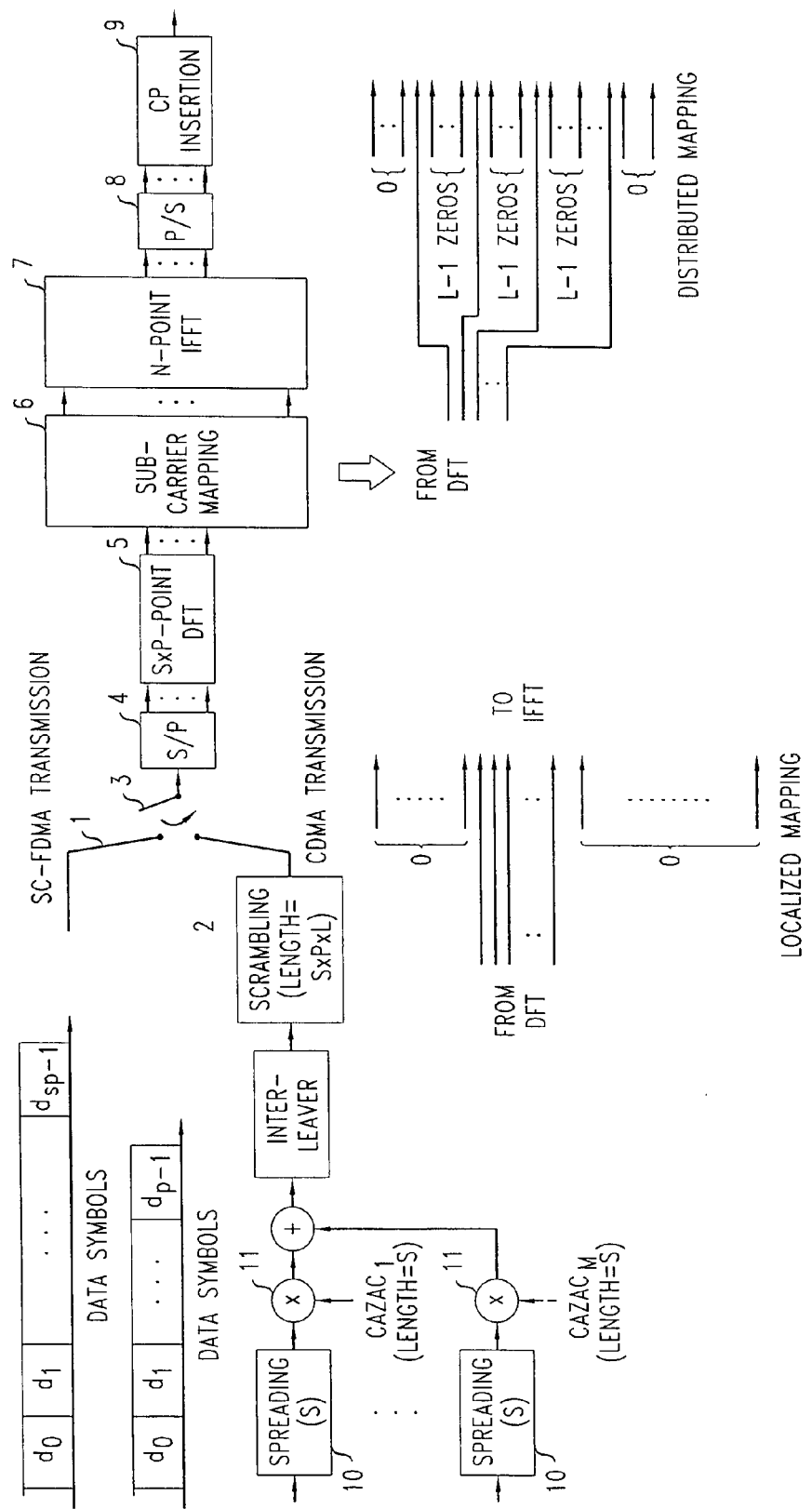
FIG. 1 schematically illustrates a transmitter structure for multiplexing CDMA and SC-FDMA transmissions.

With reference to FIG. 1, a user equipment (UE) includes a transmitter for time multiplexing CDMA and SC-FDMA transmissions and transmitting them in the uplink of an LTE-compliant network. It includes first and second branches 1 and 2 to give different paths through the transmitter for high rate data traffic and voice traffic respectively. In the first branch 1, concerned with SC-FDMA transmission, a stream of data symbols $d_0$, $d_1$ to $d_{sp-1}$ is applied via a selector 3 to a serial to parallel data converter 4, the outputs of which are then applied to a DFT 5. This is followed by sub-carrier mapping at 6, an N-point inverse fast Fourier transform (IFFT) 7 and a parallel to serial data converter 8. The cyclic prefix CP is inserted at 9 prior to transmission on the uplink to a base station. This is the mode used for data having less stringent latency requirements and fast data rates.

The transmitter also includes the second branch 2 for operation in the CDMA mode for voice traffic. Data symbols $d_0$, $d_1$ to $d_{p-1}$ are subjected to block repetition at 10 and then scrambled by a CAZAC code at 11. By utilizing the zero cyclic autocorrelation property of the CAZAC sequence, orthogonal transmission of multiple users is possible in the presence of fading. The data is interleaved and scrambled with a length S×P×L and is then applied via the selector 3 to the common path of the system, as described above, via which the data for SC-FDMA transmission is also sent.

Figure 2:
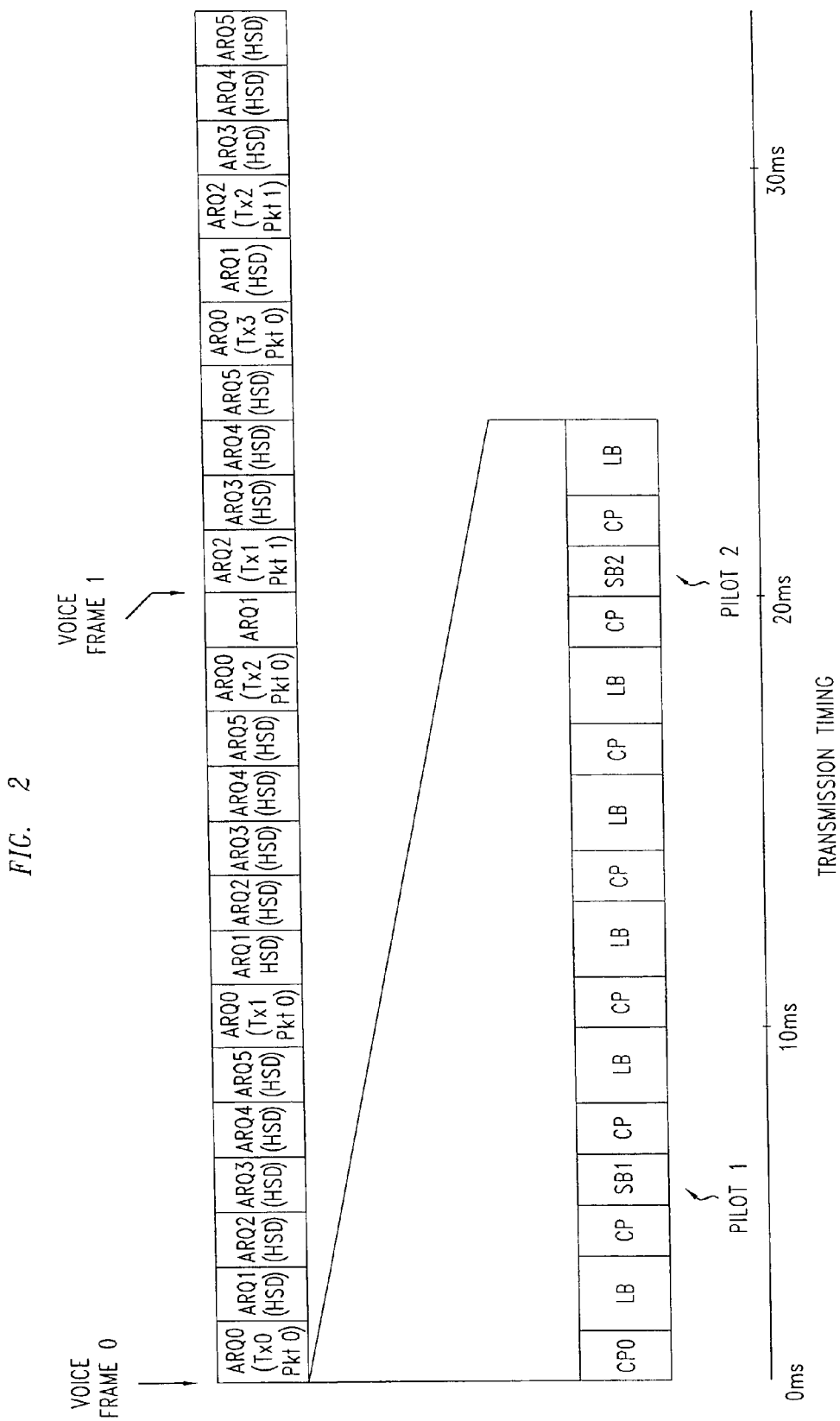
FIG. 2 illustrates a HARQ structure for voice and high-speed data.

The transmission mode may thus be either SC-FDMA or CDMA depending on the nature of the data to be transmitted. The mode is selected per transmission time interval (TTI) depending on the HARQ process ID. FIG. 2 shows the HARQ structure for voice and high-speed data (HSD) transmission. LB and SB denote long block and short block respectively.

The multiplexing structure and HARQ operation may be optimized for VoIP. Synchronous HARQ operation is assumed for the uplink and use of a 7.95 kbps AMR codec with header compression. The information bit rate before coding is 10.8 kbps. This corresponds to packet size of 216 bits, generated every 20 msec voice frame.

The number of sub-carriers available in a long block (LB) is 300. This means that 25 symbols with SF=12 may be transmitted in a LB. With 6 LBs in a sub-frame, 150 symbols can be transmitted in a LB. Assuming an 18 bit MAC header, a 16 bit CRC, and code rate of R=⅓, the number of encoded bits is $$(216+18+16) \times 3 = 750 \text{ bits} \tag{1}$$

For QPSK modulation, the number of available symbols is 332 symbols per 20 msec. Therefore, three sub-frames are required for one transmission of the encoded voice frame, taking 1.5 ms per transmission. The TTI length is assumed to be 1.5 ms.

FIG. 2 illustrates a possible VoIP transmission structure with HARQ. The number of HARQ processes is assumed to be six, and maximum number of transmissions is assumed to be four. For each sub-frame, there are six long blocks (LB) and two short blocks (SB). The two SBs contain the pilot signal for coherent demodulation. Three sub-frames comprise a TTI for voice transmission. For a voice frame arriving every 20 ms, a maximum of four transmissions is possible using two HARQ processes. The remaining HARQ processes may be used for high-speed data (HSD) transmission.

For VoIP, the maximum air interface delay is obtained as:

$$1.5 \text{ ms[queuing delay]} + (9 \times 3 + 1.5) \text{ ms[transmission/retransmission]} + \text{ACK/NACK delay} = 30 \text{ ms} + \text{ACK/NACK delay} \tag{2}$$

If the number of HARQ processes is reduced to one, two transmissions are allowed for each voice frame. Latency may be improved greatly, at the expense of reduced early termination gain. Thus, SC-FDMA retains the benefit of high data rate by dynamic scheduling, whereas low data rate traffic may utilize CDMA transmission.

Figure 3:
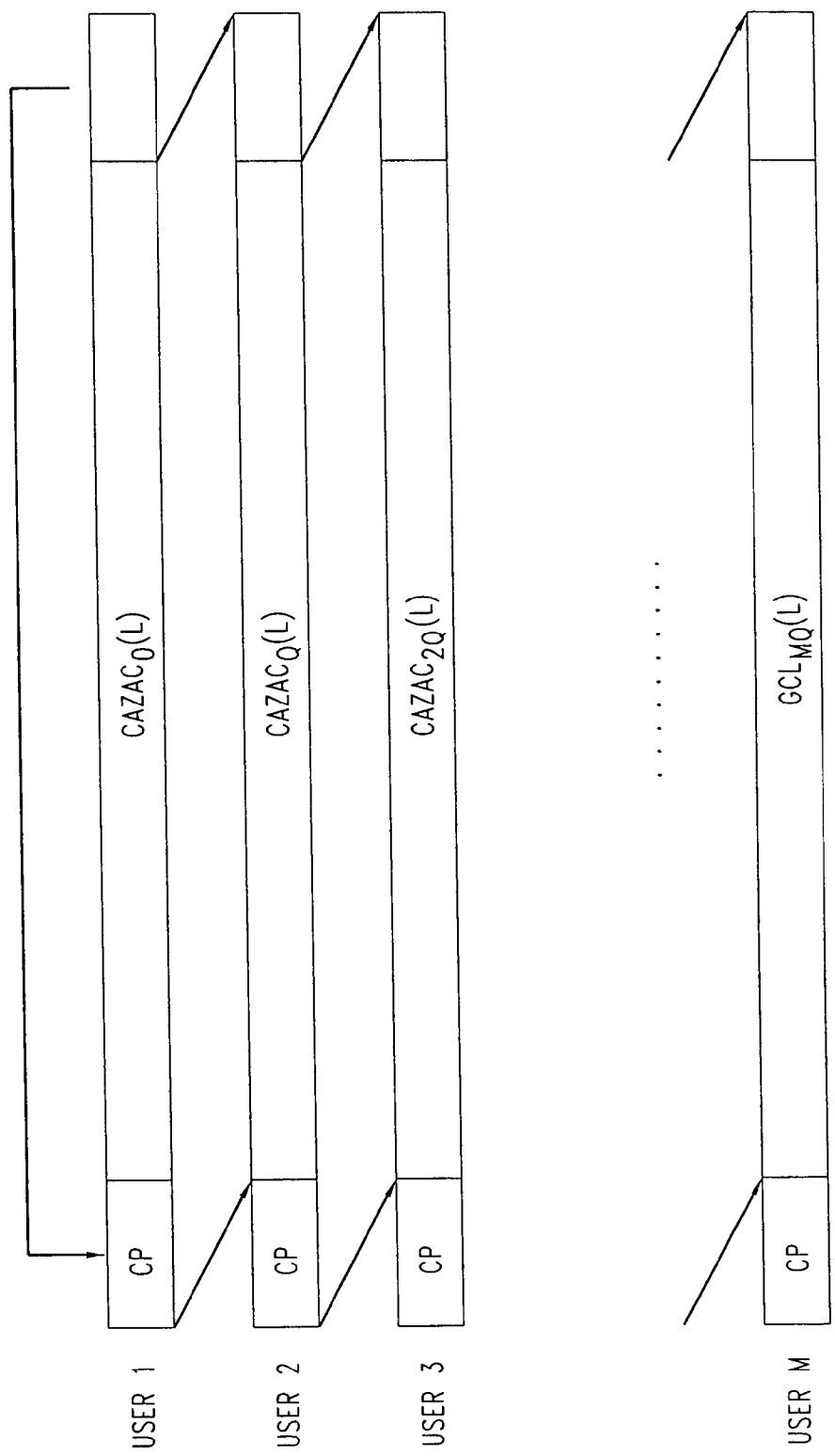
FIG. 3 illustrates the generation and allocation of cyclically orthogonal CAZAC sequences.

FIG. 3 illustrates how to generate a set of orthogonal CAZAC sequences by a cyclic shift of the basic CAZAC sequence. As long as the cyclic shift is longer than the maximum delay spread, the cyclically-shifted sequences are orthogonal. For GSM TU profile, the maximum delay spread is 5 μsec. In 5 MHz bandwidth, this corresponds to 39 samples. Q is selected to be 39. The number of shift-orthogonal CAZAC sequences of length 300 is eight. Up to eight users can use orthogonal CAZAC sequences. Different CAZAC sequences can be used to support a larger number of users.

Figure 4:
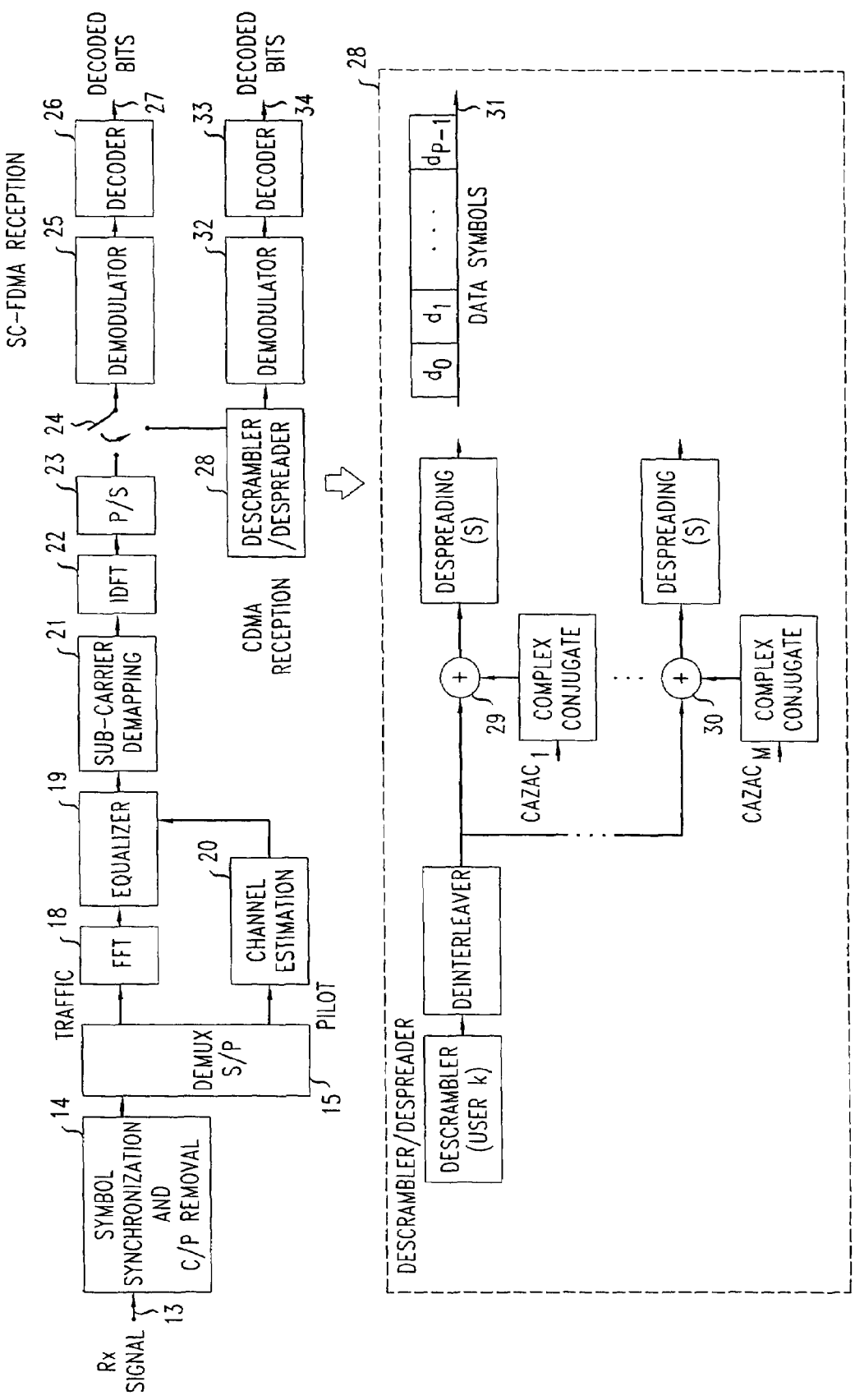
FIG. 4 schematically illustrates a receiver for receiving signals from the transmitter of FIG. 1.

With reference to FIG. 4, a receiver for receiving transmissions from the transmitter illustrated in FIG. 1 includes a front-end 12 which is shared between the SC-FDMA mode and the CDMA mode. The CDMA mode is shown for a single-user.

The signal is received at 13 and signal synchronization and CP removal carried out at 14. Coarse timing synchronization of the OFDM system is assumed, where the received signal is aligned at the OFDM symbol boundary. The signal is applied to a demultiplexer 15 to provide traffic signals on line 16 and pilot signals on line 17. The traffic data is applied to a fast Fourier transform (FFT) 18 to transform it to the frequency domain for equalization at an equalizer 19. Adjustment is made for channel conditions, using an input from a channel estimator 20 based on the received pilot signals. Sub-carrier de-mapping is implemented at 21 followed by an inverse discrete Fourier transform (IDFT) 22 and a parallel to serial converter 23 to covert the signal back to the time domain.

A selector 24 routes SC-FDMA modulated data to an appropriate demodulator 25 and decoder 26 to provide the decoded bits at output 27. The selector 24 also acts to route CDMA modulated data to a descrambler/demodulator 28. At the descrambler/demodulator 28, the complex conjugates of the CAZAC codes are applied at 29 . . . 30 in conjunction with block despreading, using the per-user CAZAC sequence, to recover the data symbols at 31. These are applied to associated demodulators 32 and decoder 33 to obtain the decoded bits at outputs 34. By the properties of orthogonal CAZAC sequence, multiple access interference (MAI) is reduced compared with conventional direct-spread CDMA systems.

Figure 5:
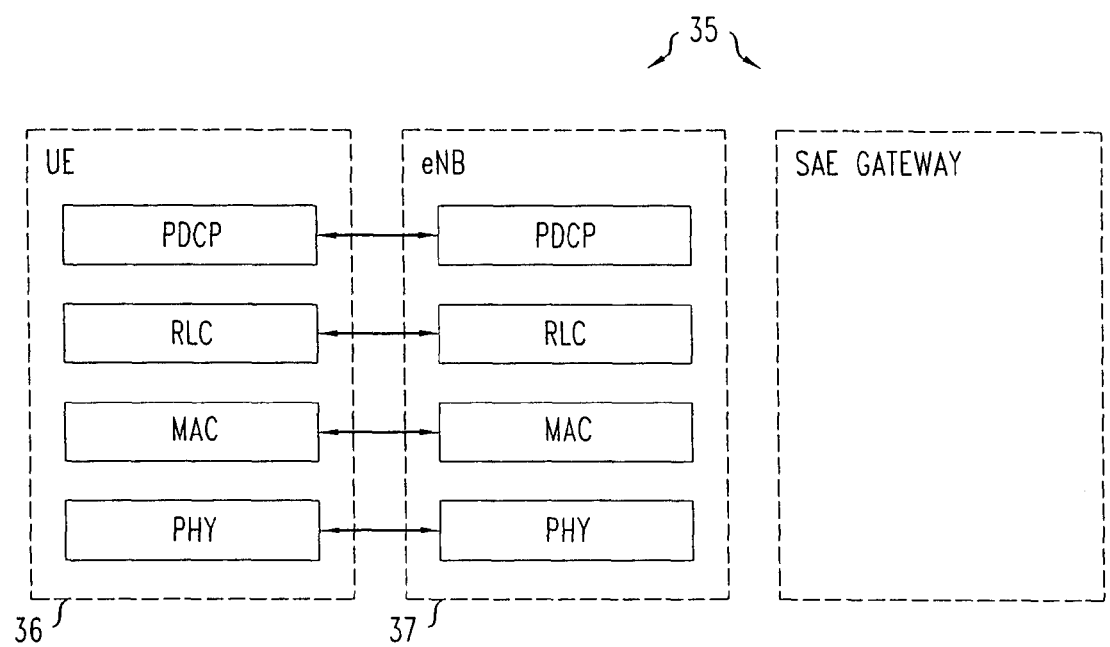
FIG. 5 schematically illustrates an LTE network in accordance with the invention.

With reference to FIG. 5, an LTE network 35 includes a plurality of UEs 36 and eNodeBs 37. The UEs 36 incorporate transmitters as shown in FIG. 1 and the eNodeBs 37 incorporate receivers as shown in FIG. 4.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for transmitting data via a packet wireless telecommunications network, including the steps of:
applying at a user terminal a Code Division Multiple Access (CDMA) scheme to control data and to voice traffic data to encode the control data and voice traffic data to provide CDMA transmissions;
autonomously transmitting the encoded data in an Orthogonal Frequency Division Multiplexing (OFDM) frame structure which includes a cyclic prefix (CP);
providing at the user terminal Single Carrier-Frequency Division Multiple Access (SC-FDMA) transmissions of data packets having a larger payload than the CDMA encoded packets; and
time multiplexing the CDMA and SC-FDMA transmissions at the user terminal.

2. The method as claimed in claim 1 and including block repetition followed by scrambling by Constant-Amplitude Zero Auto-Correlation (CAZAC) sequence to encode the data as a CDMA scheme.

3. The method as claimed in claim 2 and wherein users are assigned different orthogonal sequences.

4. The method as claimed in claim 2 and wherein users are assigned different pseudo-random sequences with low correlation property.

5. The method as claimed in claim 2 and wherein users with similar radio propagation conditions are placed in a group and assigned orthogonal CAZAC sequences, and different groups are assigned different basic CAZAC sequences.

6. The method as claimed in claim 1 and wherein the CAZAC CDMA modulated data is applied to a Discrete Fourier Transform (DFT) for spreading across sub-carriers.

7. The method as claimed in claim 6 and wherein the CP is inserted following the DFT.

8. The method as claimed in claim 1 wherein the OFDM frame structure is used in Single Carrier-Frequency Division Multiple Access (SC-FDMA).

9. The method as claimed in claim 1 wherein the transmission is in the uplink between a user terminal and a base station.

10. The method as claimed in claim 1 wherein the method is implemented by a network in accordance with UMTS Long Term Evolution (LTE).

11. The method as claimed in claim 1 and wherein the traffic data is VoIP data.

12. The method as claimed in claim 1 and wherein the control data is low bit-rate data including control signals.

13. The method as claimed in claim 1 and wherein Hybrid Automatic Repeat Request (HARQ) process ID is used to identify in which mode of transmission data is to be sent.

14. A wireless telecommunications network for transmitting data packets, comprising: a base station; and including a transmitter having a first transmission path including an encoder for encoding control data and voice traffic data using a CDMA scheme and arranged to autonomously transmit the encoded data in an OFDM frame structure which includes a Cyclic Prefix (CP) and the transmitter having a second transmission path for Single Carrier-Frequency Division Multiple Access (SC-FDMA) transmissions of data packets having a larger payload than the CDMA encoded packets; and the transmitter comprising a multiplexer for time multiplexing the CDMA transmissions and SC-FDMA transmissions.

15. The network as claimed in claim 14 and wherein the encoder performs block repetition followed by scrambling by CAZAC sequence to encode the data as a CDMA scheme.

16. The network as claimed in claim 14 and wherein the data is transmitted in the uplink.

17. The network as claimed in claim 14 and wherein the network is implemented in accordance with LTE standards.

18. A transmitter for a wireless telecommunication arrangement, comprising a first transmission path including an encoder for encoding control data and voice traffic data using a CDMA scheme and being arranged to autonomously transmit the encoded data in an OFDM frame structure which includes a Cyclic Prefix (CP) and a second transmission path for Single Carrier-Frequency Division Multiple Access (SC-FDMA) transmissions of data packets having a larger payload than the CDMA encoded packets; and the transmitter comprising a multiplexer for time multiplexing the CDMA transmissions and SC-FDMA transmissions.

19. The transmitter as claimed in claim 18 and wherein the encoder performs block repetition followed by scrambling by CAZAC sequence to encode the data as a CDMA scheme.

20. The transmitter as claimed in claim 18 and comprising a multiplexer for time multiplexing CDMA transmissions with SC-FDMA transmissions in the uplink.

21. A receiver for a wireless telecommunication arrangement, comprising a first receiver path that includes a receiver processor for decoding received transmissions of control data and voice traffic data that has been encoded using a CDMA scheme autonomously transmitted in an OFDM frame structure which includes a Cyclic Prefix (CP) and a second receiver path for decoding Single Carrier-Frequency Division Multiple Access (SC-FDMA) transmissions of data packets having a larger payload than the CDMA encoded packets; and a demultiplexer for time demultiplexing the received CDMA transmissions and the received SC-FDMA transmissions.

22. The receiver of claim 21 and comprising a successive interference cancellation (SIC) receiver processor.

23. The receiver of claim 21 and comprising a decoder for decoding SC-FDMA transmissions time multiplexed with CDMA transmissions.

* * * * *